Dec. 27, 1966  E. CARNALL, JR., ETAL  3,294,878
METHOD OF MOLDING MAGNESIUM FLUORIDE
Original Filed Oct. 29, 1959  2 Sheets-Sheet 1

Edward Carnall, Jr.
Sherley Hatch
Le Roy S. Ladd
William E. Parsons
INVENTORS

BY B. Frank Smith
Walter O. Hodsdon
ATTORNEYS

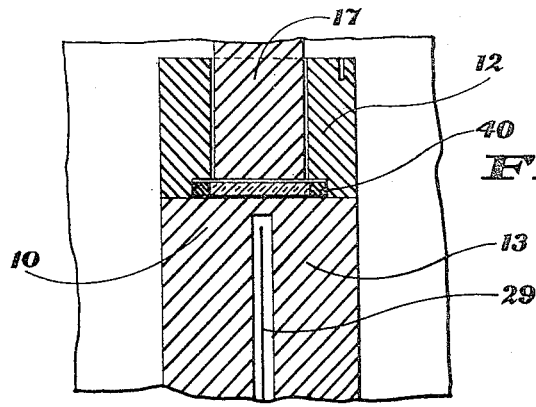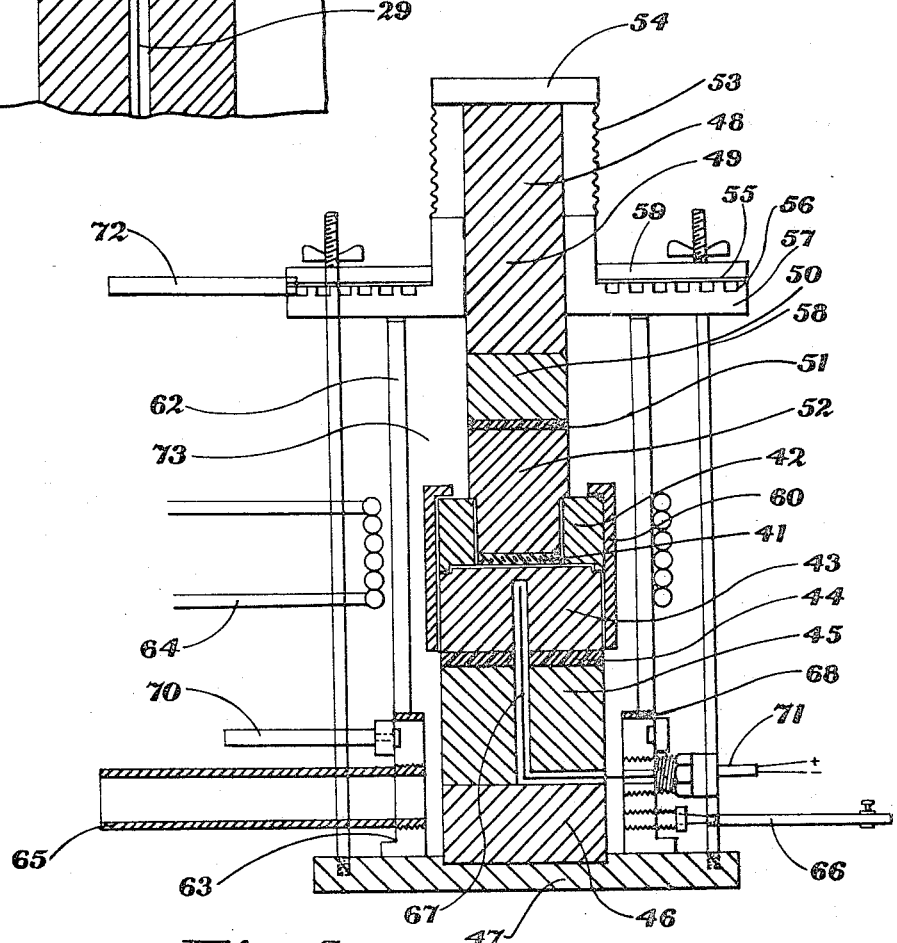

United States Patent Office 3,294,878
Patented Dec. 27, 1966

3,294,878
METHOD OF MOLDING MAGNESIUM FLUORIDE
Edward Carnall, Jr., Sherley E. Hatch, Le Roy S. Ladd, and William F. Parsons, all of Rochester, N.Y., assignors to Eastman Kodak Company, Rochester, N.Y., a corporation of New Jersey
Original application Oct. 29, 1959, Ser. No. 849,571. Divided and this application Mar. 20, 1961, Ser. No. 100,480
4 Claims. (Cl. 264—1)

This application is a division of our application Serial No. 849,571 filed October 29, 1959 (now abandoned).

This invention relates to a novel method for making optical elements. More particularly, this invention relates to methods for molding optical elements of various geometrical shapes which transmit over a broad range of the electromagnetic spectrum. These elements are characterized in that they have a polycrystalline structure. The present invention is illustrated by the description of the apparatus and method used for making an infrared transmitting solid composed of polycrystalline magnesium fluoride. Similar techniques are feasible for making molded elements which transmit in the visible and also in the micro and radio wave regions of the electromagnetic spectrum.

Heretofore, magnesium fluoride has been coated by vaporization in a vacuum onto surfaces to control the reflection from the surfaces of lenses and the like. The transmission, thermal stability and strength of such units are limited by the glass lens or other substrate upon which the magnesium fluoride is thus deposited. No such substrates appear available which possess all the properties required to provide an infrared transmitting element which is suitable for the severe conditions encountered in missiles, projectiles, satellites and related devices.

The main object of the invention is to provide a novel method for molding polycrystalline magnesium fluoride articles which are transparent to infrared rays.

In accordance with one feature of this invention, magnesium fluoride powder is pressed in a mold under condition of high pressure, high temperature and high vacuum or inert atmosphere into a solid molded unit of polycrystalline magnesium fluoride. The mold may be of any suitable shape and can be provided with a mounting for the molded unit so that the molded unit becomes fixedly attached to the mounting during the molding process. Metal mountings may be employed.

The invention will be further understood by reference to the following detailed description and drawings in which:

FIG. 4 is a section of a device similar to that shown in FIG. 3 in which a ring-like mounting member for the optical unit is shown positioned in the mold with the magnesium fluoride within the ring;

FIG. 5 is an elevational view, partly in section, of another device for molding the magnesium fluoride optical units which employs high frequency heating as the heating means.

Figure 3:
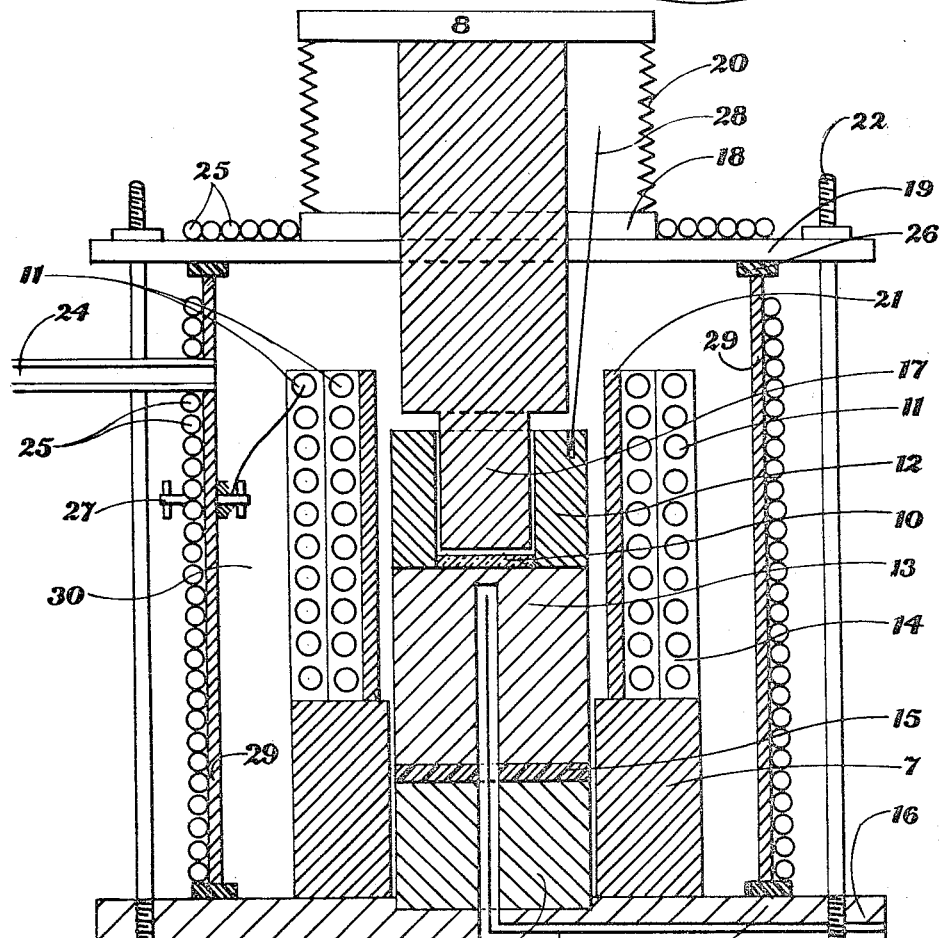
FIG. 3 is an elevational view, partly in section, of a device for molding the magnesium fluoride powder in accordance with this invention.

The molding apparatus shown in FIG. 3 comprises a base 16, a silicone gasket 23, a block 9, a thermal insulator 15, a block 13, a molding cylinder 12, a molding plunger 17 having a head 8 which is adapted to be attached to a prime mover, not shown, such as the piston of a hydraulic press to move the plunger 17 vertically into and out of molding cylinder 12 and thereby press the magnesium fluoride powder into the solid unit shown at 10.

The head 8 is attached to aligning ring 18 by metal bellows 20 thereby assuring a vacuum seal around the upper portion of the plunger 17.

A cylinder 21 encloses the molding cylinder 12 and plunger 17 and is supported on block 7. A heating unit 14 comprising a refractory casing is positioned around cylinder 21 and is also supported on block 7 and contains electric heating coils 11, the terminals for which are shown at 27. A cylinder 29 is positioned concentrically in respect to cylinder 21 and forms a vacuum chamber 30, the ends of which are closed by gaskets 23 and 26 and plates 16 and 19. Cooling coils 25 are positioned in contact with the outer surface of cylinder 29. A conduit 24 connects the vacuum chamber 30 to a suitable vacuum system not shown. The assembly is further secured by the coaction of top plate 19 and threaded rods 22 and base plate 16.

The temperature is measured by either one or by both of thermocouples 28 and 31 which are suitably located in channels respectively positioned adjacent the molding position.

The blocks 9, 13 and cylinder 12 may be made of molybdenum, molybdenum alloy, Nichrome or stainless steel.

The preferred operation of the device is as follows: Magnesium fluoride powder is placed in the molding cylinder 12 beneath plunger 17 and the apparatus is assembled as shown in FIG. 3. The magnesium fluoride powder is first cold pressed. A pressure of 5,000 pounds per square inch is exerted by the plunger 17 on the magnesium fluoride powder for a few minutes to compact the powder into a firm compact. The plunger is then removed and any excess or loose powder is removed by the operator. This cold pressing operation serves to form a level charge and prevents powder from lodging between the plunger 17 and the wall of cylinder 12 during the subsequent molding step. The cold pressing of the magnesium fluoride powder also enables the resulting compact to heat more easily since heat is conducted through the compact more efficiently than through unpressed powder.

However, suitable molded magnesium fluoride molded pieces can be manufactured by omitting the above described preliminary cold pressing step and using only the hot molding procedures now described.

The molding apparatus is again assembled as shown in FIG. 3 and is now attached to a suitable vacuum system, not shown, by means of pipe 24 and chamber 30 is evacuated to 0.2 mm. to $1 \times 10^{-5}$ mm. of mercury. Cooling water is circulated through the cooling coils 25 from a source, not shown, and electric current is supplied to the heater coils 11 through leads 27. The temperature of the mold is monitored by means of platinum-rhodium thermocouples 28 and 31. When the temperature reaches 1380° F., molding force is applied to the head 8 of plunger 17 by a hydraulic press, not shown, and over a five-minute period or less pressure is built up to between 15,000 to 25,000 pounds per square inch.

The pressure on the magnesium fluoride is maintained in this range for from 40 to 60 minutes while the temperature is held between 1380° to 1420° F. During the heating up period, the equipment gases off and the vacuum falls to approximately 0.5 mm. but gradually recovers to the .2 mm. range as the adsorbed gases are driven off and expelled.

At the end of the pressing period, the electric power is shut off, the pressure is released over a period of a few seconds to several minutes and the apparatus allowed to cool.

After a period of approximately 30 minutes, the temperature of cylinder 12 will fall to approximately 400° F. and the bolts 22 are removed and the plunger assembly and cylinder 12 and 21 are removed leaving the molded magnesium fluoride unit resting on block 13. The window is permitted to cool to room temperature, i.e. 70° F.

The molded magnesium fluoride window is then removed from the molding apparatus and employed as desired. It is a polycrystalline solid within the range of 99% up to theoretical density.

Figure 1:
FIG. 1 is a view of a round polycrystalline solid molded from magnesium fluoride powder.
Figure 2:
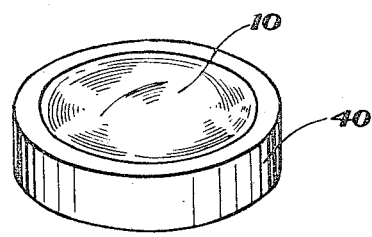
FIG. 2 is a view of a round polycrystalline solid of magnesium fluoride which was molded and during the molding operation was mounted in a stainless steel mounting.

Referring to FIG. 4, the operation of the mold there shown is substantially the same as that of FIG. 3. However, a metallic ring 40 is placed concentrically in the bottom of cylinder 12 and the powdered magnesium fluoride 10 is placed within the mounting ring 40. The pressing operation is conducted as described in connection with FIG. 3 and the result is a molded polycrystalline magnesium fluoride integrally mounted and hermetically sealed in the mounting ring as shown in FIG. 2. It is desirable to cool the molded window in this case to room temperature before removing it from the molding apparatus. The mounting ring 40 may be of metal.

The combined operation of hot pressing and sealing magnesium fluoride into steel rings requires that the coefficient of expansion of the steel and magnesium fluoride be closely matched. No. 303 stainless steel with a coefficient of expansion of $9.8 \times 10^{-6}/°$ F. between 68° F. and 930° F. functions satisfactorily from liquid nitrogen temperatures to hot pressing temperatures. Other alloys with coefficients of expansion between 7.2 and $9.1 \times 10^{-6}/°$ F. over the temperature range of 68–1000° F. have been used successfully as mounting rings. $MgF_2$ has the following coefficients of expansion:

77° F.–518° F. _____ $5.2 \times 10^{-6}/°$ F.
77° F.–824° F. _____ $6.6 \times 10^{-6}/°$ F.
77° F.–1121° F. _____ $7.4 \times 10^{-6}/°$ F.

Magnesium fluoride optical units having optimum characteristics are produced by the above-described procedures. However, units of only moderately inferior quality can be produced by pressing as described above but with pressures of 10,000 lbs./in.$^2$ and with double the pressing time. Optical units of only moderately inferior quality can be produced by reducing the optimum temperature of 1400° F. to 1150° F. and doubling the pressing time but maintaining all of the other conditions. Changes of both pressures and temperatures between the limits established by the above examples will also yield moderately satisfactory results. For example, pressures of 12,000 lbs./in.$^2$ at temperatures of 1300° F. result in moderately satisfactory molded units. The effect of pressure apparently widens the range over which the material behaves as a viscous solid.

Maintaining optimum conditions of temperature and pressure but decreasing the hot pressing period to as low as 5 minutes results in a moderately satisfactory molded unit. Lengthening it beyond 60 minutes does little if any harm but does not result in improvement.

Pressings have been made where the equipment has been gased off at a few hundred degrees Fahrenheit to improve the vacuum so that the pressing was done at approximately $10^{-4}$ mm. of mercury. This procedure gave molded units of normal appearance but baking out at 1112° F. or above at high vacuum removes water from the powder and eliminates the infrared water absorption band at 2.8 microns.

Pressings have also been made where the magnesium fluoride was subjected to pressure before the heat was turned on and the pressure maintained during the entire heating cycle. Except for this change, the pressing was carried out by the standard procedure. Moldings of normal quality resulted.

To establish further limits of the hot pressing operation, suitable molded magnesium fluoride units have been made using a 760 mm. nitrogen atmosphere instead of a vacuum. This procedure is not recommended when it is desirable to achieve maximum bonding to metal rings. The metal rings appear to be adversely affected by the nitrogen atmosphere at such temperatures. Other inert atmospheres such as helium may be employed but it was found difficult with the heaters employed and the thermal insulation used to achieve the required temperatures.

Limits are imposed on hot pressing by the available mold materials. Plunger 17, cylinder 12 and block 13 must all be resistant at high temperatures. Nichrome, graphite, molybdenum, tungsten, super alloys and ceramics such as high density alumina are satisfactory at 1400° F. under compression of the order involved in this molding. However, since the magnesium fluoride flows sufficiently under pressing conditions to exert forces of several thousand pounds per square inch on the cylinder 12, the cylinder must have high tensile strength. Cylinders made of graphite and ceramics must be quite massive to repeatedly withstand such tensile conditions. Nichrome and molybdenum can be somewhat less massive. For pressing discs ¾ inch in diameter and a few millimeters thick, wall thickness of cylinder 12 of the order of ¼ to ⅝ inch are required for Nichrome and molybdenum whereas this is insufficient for graphite and alumina. It appears an inch of wall is required for these latter materials.

A difficulty sometimes encountered in hot molding magnesium fluoride is bonding between mold parts and bonding between magnesium fluoride and mold parts. Molybdenum, graphite and alumina have proven to be the best materials for eliminating bonding between mold parts, and molybdenum and graphite are the best materials to eliminate bonding of magnesium fluoride to mold parts. Thus, both plunger 17 and cylinder 12 can be made of either molybdenum or graphite. With molybdenum plunger and cylinder, there are occasions when it may be helpful to line the cylinder with molybdenum or tungsten foil and cap the plunger with one or more pieces of molybdenum or tungsten foil. Block 13 can be made of graphite, Nichrome, molybdenum or alumina, but when bonding is a difficulty it is advisable to use one or more pieces of molybdenum or tungsten foil between the block and the magnesium fluoride. A molybdenum foil liner, Nichrome cylinder and Nichrome plunger capped with molybdenum or tungsten foil may be employed. A molybdenum or tunsten foil lined Nichrome cylinder and alumina plunger capped with molybdenum or tungsten foil also may be employed. It has been found that by spraying a colloidal graphite lubricant such as sold under the trademark "Aquadag" onto the cylinder or plunger or both, it greatly reduces the tendency for mating parts to score each other. A graphite or molybdenum disulfide coating is also effective in preventing the bonding of the magnesium fluoride to the mold.

Any permutation of the above listed materials is possible provided judicious use is made of molybdenum or tungsten foil. When graphite is used, great care is required to guard against carbon contamination of the magnesium fluoride.

Referring to FIG. 5, an elevational view, partly in section, of another modification of the molding apparatus is shown. This modification employs high frequency heating. In general, however, the parts of the apparatus are similar in kind and operation to that shown in FIG. 3.

The pressed magnesium fluoride powder is shown at 41. The apparatus comprises molding cylinder 42, molding block 43, insulator 44 and supporting blocks 45 and 46. Block 46 rests on base 47. A graphite sleeve 60 is positioned between induction heating coils 64 and members 42 and 43. Also positioned on base 47 is a cylindrical chamber 63 through which vacuum conduit 65, a vacuum release conduit 66 and a thermocouple conduit 71 extend. A water pipe 70 connects the chamber 63 to a water supply, not shown. The thermocouple is shown at 67. A quartz cylinder 62 is positioned on member 63 and separated therefrom by a gasket 68. Cylinders 62 and 63 thus form a vacuum chamber 73, the upper portion of which is closed by plate 57 having water cooling channels 56 therein. A gasket 55 forms the upper surface of the channels 56 and is held in position by clamping plate 59. The assembly is clamped by a plurality of clamping rods 58 and cooperating wing nuts.

The molding plunger 48 extends through an aligning aperture in plate 57. Freedom of motion of the plunger and a vacuum seal are achieved by means of the metal bellows 53, the ends of which are sealed respectively to the head 54 of the plunger 48 and to plate 57.

The molding plunger 48 comprises three sections; section 49 is preferably made of stainless steel, section 50 of Nichrome and section 52 of molybdenum. An insulator 51 is positioned between section 50 and 52.

In the apparatus of FIG. 5, the cylinder 42, plunger 48 and block 43 may advantageously be made of a material which will couple the high frequency field. Thus, a metal which couples efficiently rather than an inefficient metallic coupler or a dielectric material is desirable for these parts. The top and bottom plates 57 and 59 and the base plate 47 may be of aluminum. Cylinder 42, block 43 and plunger 52 preferably are of molybdenum and block 45 of Nichrome and 46 of stainless steel. The insulators 44 and 51 are of transite. The apparatus of FIG. 5 is operated at substantially the same schedule of temperature, pressure and vacuum as described above, but due to the high frequency heating, the heating cycle can be reduced to approximately a ten-minute period, the first five minutes of which is a heat-up period.

However, it is sometimes desirable to use molybdenum for parts 42, 43 and 52 and since molybdenum does not couple the high frequency field efficiently, a graphite sleeve 60 which fits snugly over the molding cylinder may be employed. The high frequency field couples and heats the graphite which in turn heats the molding cylinder by thermal conduction.

Induction heating is also advantageous in that inert atmospheres can be used more readily than with resistance heating. When employing a molding cylinder which couples the high frequency field efficiently, the graphite shield need not be used.

The apparatus of FIG. 5 can, of course, also be employed to mold mounting rims onto the magnesium fluoride molded windows in the general manner described in connection with FIG. 4 by suitable modification of the molding cylinder and plunger.

A mass of very small particles has a large surface area and a high surface-free energy. The smaller the particles, the higher the total area of the mass and the higher the surface-free energy.

Fundamental physical principles reveal that a mass of small individual particles result in a high energy state. Both the high degree of disorder and the high surface area contribute to this high energy condition. On the other hand, such particles joined together to form a perfect crystal with its maximum of order and minimum of surface area result in a minimum of energy. Such a system will tend to go from the high energy state to the minimum energy state. This is the driving force in these reactions.

At elevated temperatures, chemical bonds, "weld necks," are established between adjacent particles which are identical with or closely resemble the bonds between atoms or ions within the bulk of the crystal. This union lowers the surface-free energy of the particles, but due to the small area of contact, the surface-free energy still remains high, and it is further lowered by surface diffusion and volume diffusion of atoms or ions so that there is a maximum area of contact between the particles with the accompanying lowering of surface area and surface energy. In the case of hot pressing, as the phrase implies, pressure is brought to bear on the particles. This has the additional effect of causing plastic flow within individual particles and within the boundaries established between adjacent particles which results in further compacting and an accompanying density increase of the mess of particles. Plastic flow is very active under conditions of high pressure. When properly carried out, a mass of highly scattering particles can be joined into a mass which is optically homogeneous to infrared light of wave length greater than 2 microns.

Due to plastic flow, the crystals are subjected to a treatment similar to work hardening which, we believe, results in a material which is stronger than a presently attainable single crystal would be.

*Physical properties of hot pressed magnesium fluoride*

The hot pressed magnesium fluoride takes a good optical polish. The material is nearly water white. It scatters in the visible spectrum and to a rapidly decreasing degree to a wave length of two microns where a sample disc having a thickness of 0.100 inch reaches a transmission of 90% and continues on up to above 95%. Tests have been run in the two-micron wave length region to determine the optical homogeneity and scattering characteristics of magnesium fluoride in comparison with silicon and germanium. These tests show magnesium fluoride to be of equal quality to high resistivity silicon and germanium and one will recognize that the material will improve at longer wave lengths. In contrast with silicon and germanium, it does not appear that the transmission of magnesium fluoride will fall off at elevated temperatures. A sample heated to 1472° F. showed only small losses in transmission. Prisms have been made from hot pressed magnesium fluoride samples and refractive index data obtained. Sample points are tabulated below.

| Wave length, microns: | Refractive index |
| --- | --- |
| 1.0140 | 1.3776 |
| 2.1526 | 1.3707 |
| 3.3033 | 1.3608 |
| 4.253 | 1.3489 |
| 5.136 | 1.3347 |
| 6.692 | 1.3012 |

As can be seen from the above, one of the outstanding characteristics of magnesium fluoride is its low refractive index which makes the application of reflection reducing coatings unnecessary. However, permanent, single or multiple layer coatings can be applied to magnesium fluoride. It thus makes a useful substrate for infrared filters.

Magnesium fluoride moldings having a thickness of 3 mm. and prepared by the above-described preferred molding method show nearly theoretical transmission from 2 microns to 8 microns as shown in the following tabulation.

| Wave length, microns: | Percent transmission |
| --- | --- |
| 2 | 87 |
| 3 | 88 |
| 4 | 95 |
| 5 | 95 |
| 6 | 93 |
| 7 | 74 |
| 8 | 10 |

Reflection loss of magnesium fluoride has been calculated of from 4 to 5% over the range of wave lengths shown in the above tabulation. If these values are added to the transmission values in the tabulation, it may be seen that transmission over the range of 2 to 6 microns is from 91 to 100%.

The mechanical strength of hot pressed magnesium fluoride is generally similar to that of glass and quartz.

Extensive humidity tests have been run on hot pressed magnesium fluoride. Samples have been run at 86° F. and 96% relative humidity for seven days at 120° F. and 100% relative humidity for seven days. The transmission of these samples was run before and after the tests.

No visible or measurable optical deterioration was detected. A sample was also subjected to the one thousand cycles of MIL Standard 305 which involves not only heat and humidity but also vacuum and pressure with the presence of salt (NaCl). No visible deterioration was observed in this sample.

A magnesium fluoride window has been heated to 1292° F. in an oven on tungsten foil .008 inch thick. The window was placed on the ceramic floor of the preheated oven, remained there for one-half hour and then removed directly into room atmosphere with accompanying drafts. There was no optical or mechanical deterioration. In their steel mountings, magnesium fluoride windows at room temperature have been dropped into liquid nitrogen and removed with no deterioration. The same samples have been heated to 500° F. and dropped into water at 46° F. with no mechanical or optical deterioration. These windows heated to 572° F. and dropped into ice water showed three or four irregular surface cracks about 2 mm. long. The window did not fracture nor did the cracks penetrate the sample. Vacuum of $5 \times 10^{-5}$ could be pulled when the window was mounted in a vacuum system.

Recent measurements on the hardness of molded magnesium fluoride gave a figure of 6 on the Mohs' scale.

Hot pressing curved surfaces

Plano-convex pressings have been made using magnesium fluoride by pressing the powder into a concave mold with a flat plunger using the same general apparatus and method described in connection with FIG. 3 and FIG. 5. The magnesium fluoride powder is heated to 1400° F. over a 10 to 40-minute period and pressed at 15,000 to 25,000 p.s.i. for 20 to 80 minutes. The resultant piece of magnesium fluoride is strong and possessed all the properties described above. The plano-convex pressing may be ground and polished to form a dome with an angle of curvature up to 180°. Such domes have been formed which are 2" in diameter and 180°. Others have been formed which are 2.8" diameter and 170°.

Hemispherical domes have been made directly using magnesium fluoride by pressing the powder into a concave mold with a convex hemispherical plunger using the same general apparatus and methods described in connection with FIG. 3 and FIG. 5. The powder is heated to 1400° over a 15 to 40 minute period and pressed at 15,000 to 20,000 p.s.i. for 20 to 40 minutes. The resultant piece is then polished on its concave and convex sides to the finished dimensions. Such domes have been made which are 2" diameter and 180° curvature with a wall thickness of 4 to 5 mm.

Complex dome shapes have been made as described above, but by using a plunger whose pressing surface is composed of a series of concentric steps. The resultant pressing has a smooth convex surface and the concave side is in the form of concentric steps. This piece may be ground and polished to form a hemishperical dome. Such shapes have been made which have a 180° curvature and 2" diameter.

Hot pressing polished surfaces

In order to eliminate the polishing of the hot pressed magnesium fluoride, it has been found possible to produce a finished polished surface by hot pressing against an optically polished surface of the molybdenum mold. The resultant surface of the hot pressed magnesium fluoride, when test plated, is quite regular and for many applications will be suitable for use without additional polishing. Such a procedure has been used in forming the plano-convex piece described above. The concave molybdenum mold was ground and polished to give an optical quality surface and the magnesium fluoride pressed against this mold. The resultant convex surface of the magnesium fluoride assumed the curve of the molybdenum mold and had an optical quality finish. After several runs the mold showed no surface distortion, but scratching of the surface was in evidence. It appears that such molds will have a reasonably long life if small surface scratches can be tolerated.

We claim:
1. The method of forming a homogeneous solid of molded magnesium fluoride having a density in the range of from 99% up to and including theoretical density which comprises molding magnesium fluoride powder in an inert atmosphere under a pressure within the range of from 15,000 to 25,000 pounds per square inch and at a temperature within the range of 1380° F. to 1420° F.

2. The method of forming a homogeneous solid of molded magnesium fluoride having a density in the range of from 99% up to and including theoretical density which comprises molding magnesium fluoride powder under a pressure of approximately 5,000 pounds per square inch at normal temperatures to form a firm, compact, positioning this compact in an inert atmosphere and further pressing the compact under a pressure within the range of from 15,000 to 25,000 pounds per square inch, while maintaining the compact at a temperature within the range of 1380° F. to 1420° F.

3. The method of forming an infrared transmitting window hermetically sealed in a metallic mounting having a coefficient of expansion similar to that of magnesium fluoride which comprises placing said metallic mounting in a molding apparatus, filling the mounting with magnesium fluoride powder, evacuating the atmosphere adjacent the frame and powder to a pressure of 0.2 mm. mercury, heating the powder to a temperature in the range of 1380° F. to 1420° F., pressing the heated powder under a molding pressure of from 15,000 to 25,000 pounds per square inch and then cooling the resulting solid window to substantially normal temperatures.

4. The method of forming an infrared transmitting element comprising hot pressing magnesium fluoride powder in an inert atmosphere under a pressure within the range of from 15,000 to 25,000 pounds per square inch and at a temperature within the range of 1380° F. to 1420° F.

References Cited by the Examiner

UNITED STATES PATENTS

| | | | |
|---|---|---|---|
| 2,219,574 | 10/1940 | Fraenckel | 65—49 X |
| 2,410,616 | 11/1946 | Webb | 49—35 |
| 2,511,224 | 6/1950 | Sun et al. | 106—47 |
| 2,516,373 | 7/1950 | Ehlert et al. | |
| 2,717,225 | 9/1955 | Williams | 25—156 X |

OTHER REFERENCES

Barnes et al.: Sintering and Hot Pressing of Uranium Tetrafluoride, in Jour. Amer. Cer. Soc. 41(7): pages 246–248, July 1958.

Ryason, R.: On The Fabrication of Alkali Halide Windows in Jour. Optical Soc. of Amer., vol. 43, page 928, 1953.

ROBERT F. WHITE, *Primary Examiner.*

WILLIAM J. STEPHENSON, *Examiner.*

A. O. MAKI, S. I. COHEN, A. L. LEAVITT, B. SNYDER, *Assistant Examiners.*